(12) United States Patent
Hegde et al.

(10) Patent No.: US 11,442,843 B2
(45) Date of Patent: Sep. 13, 2022

(54) METHODS AND SYSTEMS FOR IDENTIFYING, HANDLING, AND DEBUGGING A HUNG THREAD

(71) Applicant: DISH Network Technologies India Private Limited, Bengaluru (IN)

(72) Inventors: Gajanan Hegde, Karnataka (IN); Rakesh Eluvan, Tamilnadu (IN)

(73) Assignee: DISH Network Technologies India Private Limited, Bengaluru (IN)

( * ) Notice: Subject to any disclaimer, the term of this patent is extended or adjusted under 35 U.S.C. 154(b) by 0 days.

(21) Appl. No.: 16/677,474

(22) Filed: Nov. 7, 2019

(65) Prior Publication Data
US 2021/0081300 A1 Mar. 18, 2021

(30) Foreign Application Priority Data

Sep. 13, 2019 (IN) .............................. 201941036905

(51) Int. Cl.
*G06F 11/36* (2006.01)
(52) U.S. Cl.
CPC ........ *G06F 11/3636* (2013.01); *G06F 11/366* (2013.01)
(58) Field of Classification Search
CPC .......................... G06F 11/3636; G06F 11/366
See application file for complete search history.

(56) References Cited

U.S. PATENT DOCUMENTS

| 2003/0023656 | A1* | 1/2003 | Hutchison | G06F 9/524 718/100 |
| 2005/0071814 | A1* | 3/2005 | Aguilar, Jr. | G06F 11/366 717/127 |
| 2006/0184842 | A1* | 8/2006 | Boucher | G06F 11/3624 714/55 |
| 2007/0233924 | A1* | 10/2007 | Chauvet | G06F 9/485 710/240 |
| 2010/0077258 | A1* | 3/2010 | Lee | G06F 11/2736 714/39 |

(Continued)

OTHER PUBLICATIONS

Ames Kochuba, "Developing a client to determine a hung thread problem", published by IBM, pp. 1-6 (Year: 2004).*

(Continued)

*Primary Examiner* — S. Sough
*Assistant Examiner* — Zheng Wei
(74) *Attorney, Agent, or Firm* — Kilpatrick Townsend & Stockton, LLP

(57) ABSTRACT

Various arrangements for debugging a hung thread of a software application are presented. A thread monitor module may be executed that monitors for any hung threads within a plurality of executing threads. A monitoring initialization message may be received that initiates thread monitoring of a thread. In response to the monitoring initialization message, tracking of the thread may be commenced by determining whether an update message for the thread has been received within an amount of time allotted for the update message to be sent. If the update message is not received, the thread may be identified as hung. Debugging information generated in response to identifying the hung thread may be used for creating an improved version of the software application that prevents the hang.

14 Claims, 7 Drawing Sheets

(56) References Cited

U.S. PATENT DOCUMENTS

| | | | | |
|---|---|---|---|---|
| 2012/0079459 A1* | 3/2012 | Bates | ............... | G06F 11/3636 |
| | | | | 717/129 |
| 2013/0013953 A1* | 1/2013 | Eck | ............... | G06F 9/45545 |
| | | | | 714/2 |
| 2013/0080502 A1* | 3/2013 | McColl | ............... | G06F 11/0778 |
| | | | | 709/203 |
| 2019/0171569 A1* | 6/2019 | Battle | ............... | G06F 12/0895 |
| 2019/0340048 A1* | 11/2019 | Brown | ............... | G06F 11/0751 |
| 2020/0306970 A1* | 10/2020 | Latkar | ............... | G06F 11/0793 |

OTHER PUBLICATIONS

Authors unknown, "Determination of Root Cause of A Detected Hang", published by ip.com—An IP.com Prior Art Database Technical Disclosure, IP.com No. IPCOM000152913D, pp. 1-4 (Year: 2007).*

\* cited by examiner

METHODS AND SYSTEMS FOR IDENTIFYING, HANDLING, AND DEBUGGING A HUNG THREAD

CROSS-REFERENCE TO RELATED APPLICATION

This application claims priority to Indian Application No. 201941036905, filed Sep. 13, 2019, entitled "Methods and Systems for Identifying, Handling, and Debugging a Hung Thread," the disclosure of which is hereby incorporated by reference in its entirety for all purposes.

BACKGROUND

When a software application is executed by a computerized device, it may divide itself into multiple simultaneously (or pseudo-simultaneously) executing threads. Each of these threads may function in concert to perform the functions of the application. In order for the application to execute properly, each thread must individually function properly. When a thread crashes or an exception occurs, a stack trace dump may be obtained. Data from the stack trace dump can be used to reconstruct the events that led to the thread crashing. From this information, a future version of the application can be improved to address the issue that lead to the thread crashing.

SUMMARY

Various embodiments are described related to a method for debugging a hung thread. In some embodiments, a method for debugging a hung thread is described. The method may comprise executing a thread monitor module. The thread monitor module may monitor for any hung threads within a plurality of executing threads. The method may comprise receiving, by the thread monitor module, a monitoring initialization message to initiate thread monitoring of a thread of the plurality of executing threads. The monitoring initialization message may comprise a thread identifier of the thread and an update frequency time period. The method may comprise, in response to the monitoring initialization message, commence tracking, by the thread monitor module, the thread by determining whether an update message for the thread has been received within the update frequency indicated in the monitoring initialization message. The method may comprise receiving, by the thread monitor module from the thread, the update that indicates the thread may not be hung. The method may comprise determining, by the thread monitor module, that at least the update frequency time period has elapsed since the update message has been received from the thread, thereby identifying the thread as the hung thread. The method may comprise, in response to determining that at least the update frequency time period has elapsed since the update has been received from the thread, raising a defined signal on the hung thread.

Embodiments of such a method may include one or more of the following features: the method may further comprise, in response to the defined signal being raised on the hung thread, causing a signal handler mapped to the signal to be executed on top of a stack of the hung thread. The method may further comprise registering, with an operating system that executed the thread, the signal handler mapped to the signal. The method may further comprise obtaining, by the signal handler, a stack trace of the hung thread. The method may further comprise creating a report on the hung thread based on the stack trace. The method may further comprise outputting the report on the hung thread via the Internet to a remote diagnostic server system. The method may further comprise outputting, by the thread monitor module, an indication of the hung thread to an application being executed. The method may further comprise receiving, by the thread monitor module, from the application, an indication of an action to perform to remediate the hung thread. The action may be to restart the application. The action may be to restart a device on which the application and the hung thread may be executing. The thread monitor module may be executed by a streaming media player device.

In some embodiments, a system for debugging a hung thread is described. The system may comprise an application, comprising a plurality of threads, executed by a processing system of a device. The system may comprise a thread monitor module executed by the processing system of the device that monitors for any hung threads within the plurality of threads being executed by the processing system of the device. The thread monitor module may be configured to receive a monitoring initialization message from a thread of the plurality of threads to initiate thread monitoring of the thread. The monitoring initialization message may comprise a thread identifier of the thread and an update frequency time period. The thread monitor module may be configured to, in response to the monitoring initialization message, track the thread by determining whether an update for the thread has been received within the update frequency indicated in the monitoring initialization message. The thread monitor module may be configured to receive, from the thread, the update that may indicate the thread may not be hung. The thread monitor module may be configured to determine that at least the update frequency time period has elapsed since the update has been received from the thread, thereby identifying the thread as the hung thread. The thread monitor module may be configured to, in response to determining that at least the update frequency time period has elapsed since the update has been received from the thread, raise a defined signal on the hung thread.

Embodiments of such a system may include one or more of following features: the thread monitor module may be further configured to cause a signal handler mapped to the signal to be executed on top of a stack of the hung thread in response to the defined signal being raised on the hung thread. The thread monitor module may be further configured to register the signal handler mapped to the signal with an operating system that executed the thread. The signal handler, when executed on top of the stack of the hung thread may be configured to obtain a stack trace of the hung thread. The thread monitor module may be further configured to output a report generated based on the stack trace via the Internet to a remote diagnostic server system. The thread monitor module may be further configured to output an indication of the hung thread to another thread of the application. The thread monitor module may be further configured to receive an indication of an action to perform to remediate the hung thread. The system may further comprise a streaming media player device that may comprise the processing system.

In some embodiments, a non-transitory processor-readable medium comprising processor-readable instructions is described. The non-transitory processor-readable medium comprising processor-readable instructions may be configured to cause one or more processors to receive a monitoring initialization message from a thread of the plurality of threads to initiate thread monitoring of the thread. The monitoring initialization message may comprise a thread identifier of the thread and an update frequency time period. The one or more processors, in response to the monitoring initialization message, may track the thread by determining whether an update for the thread has been received within the update frequency indicated in the monitoring initialization message. The one or more processors may receive, from the thread, the update that indicates the thread may not be hung. The one or more processors may determine that at least the update frequency time period has elapsed since the update has been received from the thread, thereby identifying the thread as a hung thread. The one or more processors, in response to determining that at least the update frequency time period has elapsed since the update has been received from the thread, may raise a defined signal on the hung thread.

Embodiments of such a medium may include one or more of the following features: the processor-readable instructions may be further configured to cause the one or more processors to cause a signal handler mapped to the signal to be executed on top of a stack of the hung thread in response to the defined signal being raised on the hung thread.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
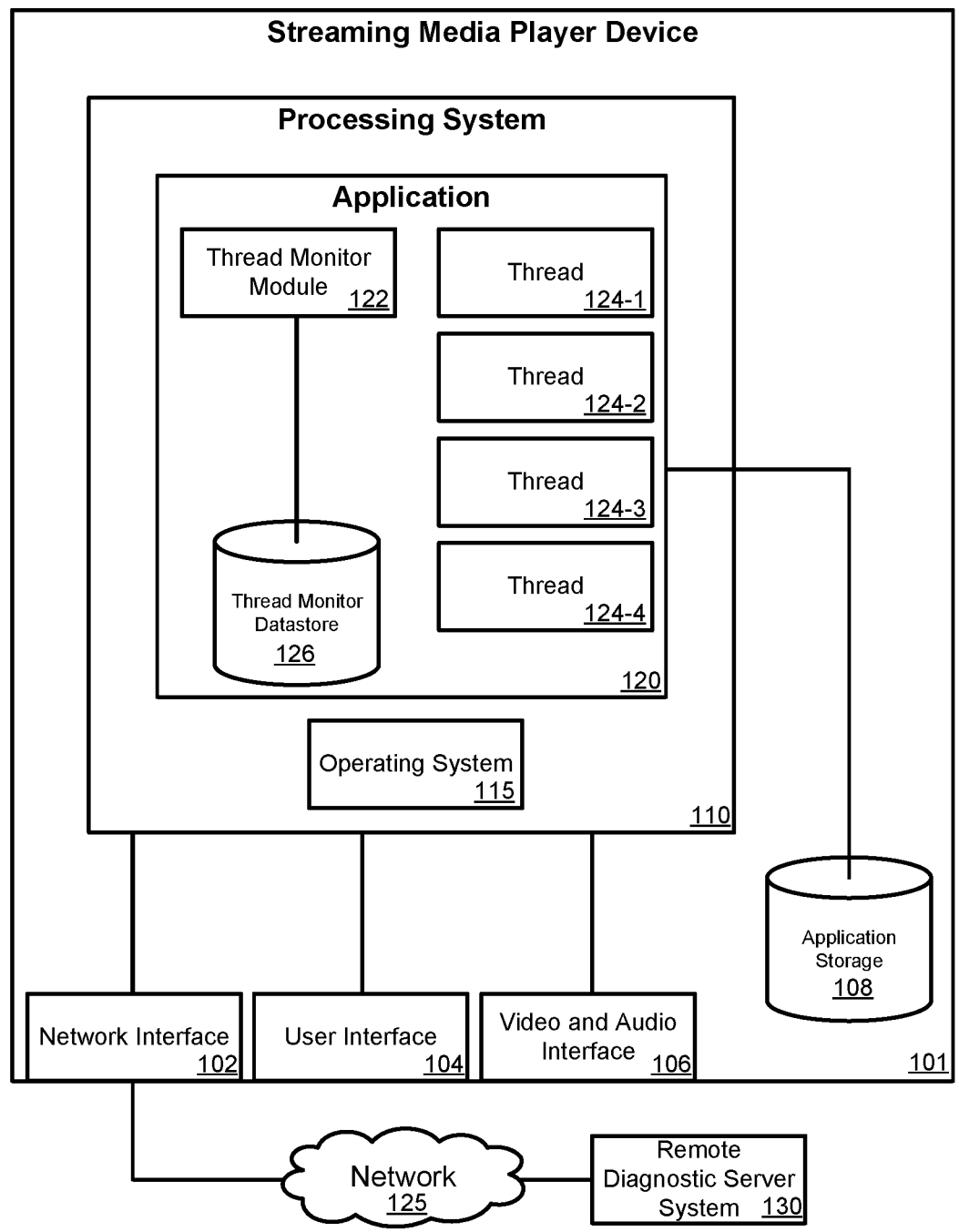
FIG. 1 illustrates an embodiment of a system that performs thread monitoring.

Diagnosing a hung (or stuck) thread may be more problematic than diagnosing a crashed thread. A hung thread can be generally defined as a thread that is being blocked from continuing to execute by a blocking call or is waiting on locked object to be released so that the thread can use the object. By default, a thread may continue to wait indefinitely for the blocking call to be complete or the locked object to be released, therefore, the thread may hang indefinitely. Since the thread has not crashed, a mechanism may not be readily available to identify that the thread is hung and to obtain a stack trace dump. Diagnosing and addressing issues that cause a thread to hang may be similarly important to proper functioning of a software application. If one or more threads hang, the application may be unable to continue or function property, depending on the tasks that were being performed by the threads. Embodiments detailed herein help improve the functioning of applications that execute as multiple threads by helping to identify hung threads and provide debug information as to improve the stability of the application in the future versions.

In embodiments detailed herein, the concept of having a thread monitor module execute as part of an application. Other threads of the application may register with the thread monitor module and specify a frequency at which updates messages will be provided to the thread monitor module. By an update being received at the specified frequency by the thread monitor module, the thread is determined to be active (i.e., not hung). If an update is not received by the thread monitor module at the specified frequency, the thread monitor module may determine that the thread has become a hung thread.

In response to the thread being identified as hung, a message may be transmitted to another thread of the application. This other thread may receive an indication of the hung thread and can make a decision as to whether the thread should be stopped, restarted, or the application or device should be restarted. The thread monitor module may also cause a signal to be raised for the hung thread that was previously registered with the operating system. The signal may be a custom signal that has no implicit meaning to the operating system and can trigger a custom signal handler that has been programmed to examine the stack of the hung thread. The signal may cause a custom signal handler to be executed as part of the thread on top of the hung thread's stack. By the custom signal handler being executed, the thread essentially becomes unstuck and executes the custom signal handler. The thread may again hang when the signal handler has completed execution.

The signal handler may examine the stack and create a log or report that indicates a predefined number of elements that are being executed as part of the hung thread's stack. This report may be transmitted to a remote server for use in diagnosing the thread. This log or report may then be used to generate analytics, analyzed by a developer to attempt to determine what caused the thread to hang, or both. The source code of the thread or other threads of the application may then be reprogrammed in order to address the problem that caused the thread to hang, thus resulting in a more stable application that has fewer threads that hang and better performance.

Further detail regarding such embodiments is provided in relation to the figures as follows. FIG. 1 illustrates an embodiment of a system 100 that performs thread monitoring. System 100 can include streaming media device 101. Streaming media device 101 can be a computerized device that is configured to receive a stream of digital media from a remote source, such as a streaming media provider via the Internet, and output the streaming media for presentation to a user, such as via a television or via built-in audio and video components of the streaming media player device. While system 100 includes a streaming media device 101, other forms of computerized devices may be possible, such as: a tablet computer, a laptop computer, a gaming device, a set top box, smart television, a home assistant device, an over-the-air (OTA) television channel streaming device, smart home device, Internet of Things (IoT) device, or some other form of computerized device.

Streaming media player device 101 (or some other form of computerized device) may have various components, including network interface 102, user interface 104, video and audio interface 106, one or more non-transitory processor-readable mediums used to store data such as application storage 108, and processing system 110. Network interface 102 may include a wired network interface, wireless network interface, or both that may be used to communicate with network 125. Network 125 can include a local network, such as a IEEE 802.11 based wireless local area network, and one or more public or private networks, such as a network operated by an Internet Service provider and the Internet. User interface 104 may be a component integrated as part of streaming media player device 101, such as a touch screen or buttons, that allows a user to provide input to streaming media player device 101. User interface 104 may alternatively be a separate component, such as a remote control, that a user can operate to send a command to streaming media player device 101. Streaming media player device 101 can include video and audio interface 106. In some embodiments, a screen and/or a speaker may be incorporated into streaming media player device as video and audio interface 106 to allow for video and/or audio to be output for presentation to a user directly. Alternatively, video and audio interface 106 may allow for video and/or audio to be output to a separate device for presentation to user, such as a television.

Streaming media player device can include processing system 110, which can include one or more processors. Processing System 110 may include one or more special-purpose or general-purpose processors. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD).

Processing system 110 can execute operating system 115 and various software applications. A software application may come pre-installed on streaming media player device as part of application storage 108. Additionally or alternatively, one or more applications may be obtained from an "app store" by a user accessing the app store and selecting the application for download. The application may be downloaded to application storage 108 and installed. In the illustrated embodiment of system 100 of FIG. 1, application 120 is being executed.

Operating system 115 may execute on processing system 110 and handle communications between threads being concurrently executed by processing system 110. Operating system 115 may be based on Android®, iOS®, Linux®, or some other platform. For instance, a thread may register one or more signals with operating system 115. Each of these signals may be linked with a signal handler. When the signal is triggered by another thread, other elements of the thread being executed may be paused and the thread may be forced to execute the signal handler.

Application 120, when executed by processing system 110, can be executed by processing system 110 in the form of multiple threads. One or more of the threads may be part of thread monitor module 122. A primary task of thread monitor module 122 is to identify any other threads that are part of application 120 that have become hung. Since some threads may be expected to pause execution for relatively significant periods of time while other threads may only pause for relatively short periods of time, it may be important for thread monitor module 122 to have stored data that indicates custom data indicative of how much time should be permitted to elapse before the thread is identified by thread monitor module 122 as hung. Thread monitor module 122 may store data about each thread which it is monitoring to thread monitor datastore 126, which may be stored using one or more non-transitory processor-readable mediums.

Application 120, in addition to the one or more threads of thread monitor module 122, includes one or more additional threads 124 (e.g., thread 124-1, thread 124-2, thread 124-3, and thread 124-4) that perform the substantive functions of the application (e.g., receive and output streaming media for presentation). In this example, four threads are being executed as part of application 120 in addition to the one or more threads of thread monitor module 122. In other embodiments, fewer or greater numbers of threads may be executed as part of application 120. Some or all of these threads may be registered with thread monitor module 122. If a thread is not registered with thread monitor module 122, thread monitor module 122 does not monitor the thread and cannot determine if the thread is hung. If the thread is registered with thread monitor module 122, thread monitor module monitors the thread. If the thread is determined to be hung, thread monitor module 122 can: 1) cause a signal handler to be executed on top of the stack of the hung thread; 2) create a report indicating the thread that has hung (which can be output to a remote destination, such as remote diagnostic server system 130); 3) report the hung thread to another thread of application 120; and 4) receive a command on how the hung thread should be handled.

Figure 2:
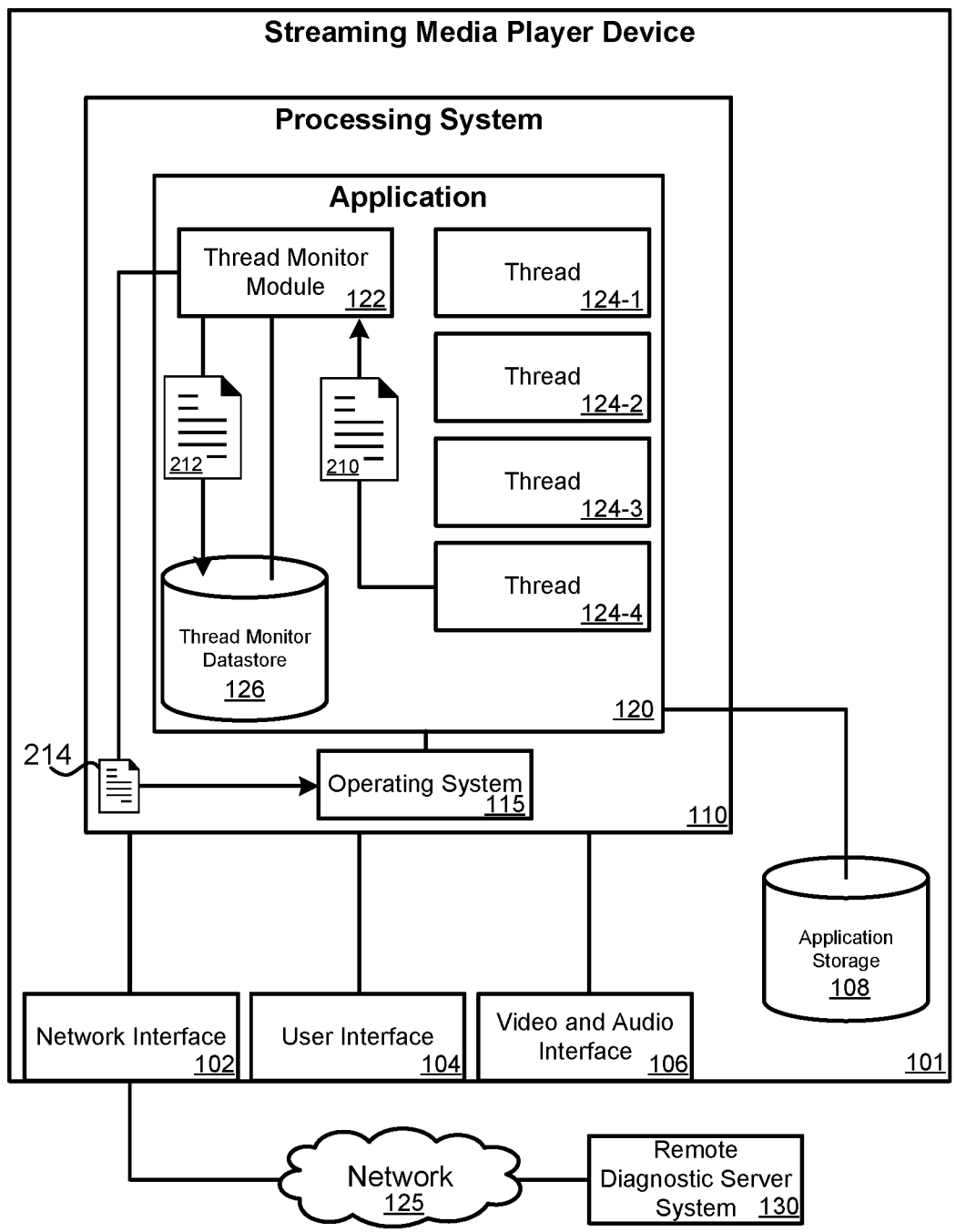
FIG. 2 illustrates an embodiment of the system in which new thread registering with the system that performs thread monitoring.

Further detail regarding the function of thread monitor module 122 and system 100 is provided in relation to FIGS. 2-5. FIG. 2 illustrates an embodiment of system 200 in which a new thread is registered with the system that performs thread monitoring. System 200 can represent an embodiment of system 100 in which a new thread is in the process of registering with thread monitor module 122.

In system 200, thread 124-4 recently began execution. Thread 124-4 may be coded such that one of the first tasks that is performed when the thread is executed is to register with thread monitor module 122. To perform registration, thread 124-4 may transmit monitoring initialization message 201 to thread monitor module 122. Monitoring initialization message 210 can include: 1) an identifier of thread 124-4; 2) an update reporting interval; 3) a missed update threshold; and, possibly 4) the importance class of the thread. The importance class can be useful for the software application to decide a course of action when a thread is hung or stuck.

Upon receipt of monitoring initialization message 210, thread monitor module 122 may store data 212 from monitoring initialization message 210 to thread monitor datastore 126. An amount of time that has elapsed since a previous update from thread 124-4 may be tracked. The monitoring initialization message 210 may serve as the first update or, in some embodiments, monitoring may not being until a first update message is received from thread 124-4. Thread monitor module 122 may track thread 124-4 to ensure that an update message is received by thread monitor module 122 at least as frequently as the update reporting interval specified for thread 124-4 in monitoring initialization message 210.

The update messages sent by thread 124-4 to thread monitor module 122 may be performed via an API (application programming interface) call. Similarly, the initialization message may be transmitted to the thread monitor module in the form of an API call. Therefore, a registered signal through the operating system is not used for update messages.

In some embodiments, a missed update threshold may be specified. The missed update threshold may be specified to identify a deviation from a default threshold. In some embodiments, a single update that is not received within the update reporting interval may trigger thread 124-4 to be determined to be hung. However, a developer may rather desire the thread to occasionally be permitted to miss an update and not be identified as hung. Therefore, the missed update threshold may be specified to be some number higher than 1, such as 5. In such an embodiment, if five consecutive updates are missed from being reported within the update reporting interval, thread 124-4 will be identified as hung. In other embodiments, the missed updates may not need to be consecutive. For instance, a rolling window may be analyzed. For instance, if 5 updates are missed from being reported within a rolling window of 50 update reporting intervals, thread 124-4 may be identified as hung.

In response to receiving monitoring initialization message 210, signal 214 may be registered with operating system 115. Signal 214 that is mapped to a signal handler function and thread 124-4 may be registered with operating system 115. After the signal being registered with operating system 115, if thread monitor module 122 raises the signal with operating system 115, operating system 115 will cause the linked signal handler to be executed on top of the stack of thread 124-4.

Thread monitor module 122 may continue to monitor thread 124-4 as long as thread 124-4 remains registered with thread monitor module 122. Thread 124-4 may send a deregistration message to thread monitor module 122 when thread 124-4 is no longer to be monitored. For instance, thread 124-4 may be programmed to send a deregistration message as one of its last functions before ending execution. When a deregistration message is received by thread monitor module 122, data related to thread 124-4 may be removed from thread monitor datastore 126 or archived and thread 124-4 may no longer be monitored for received updates.

Figure 3:
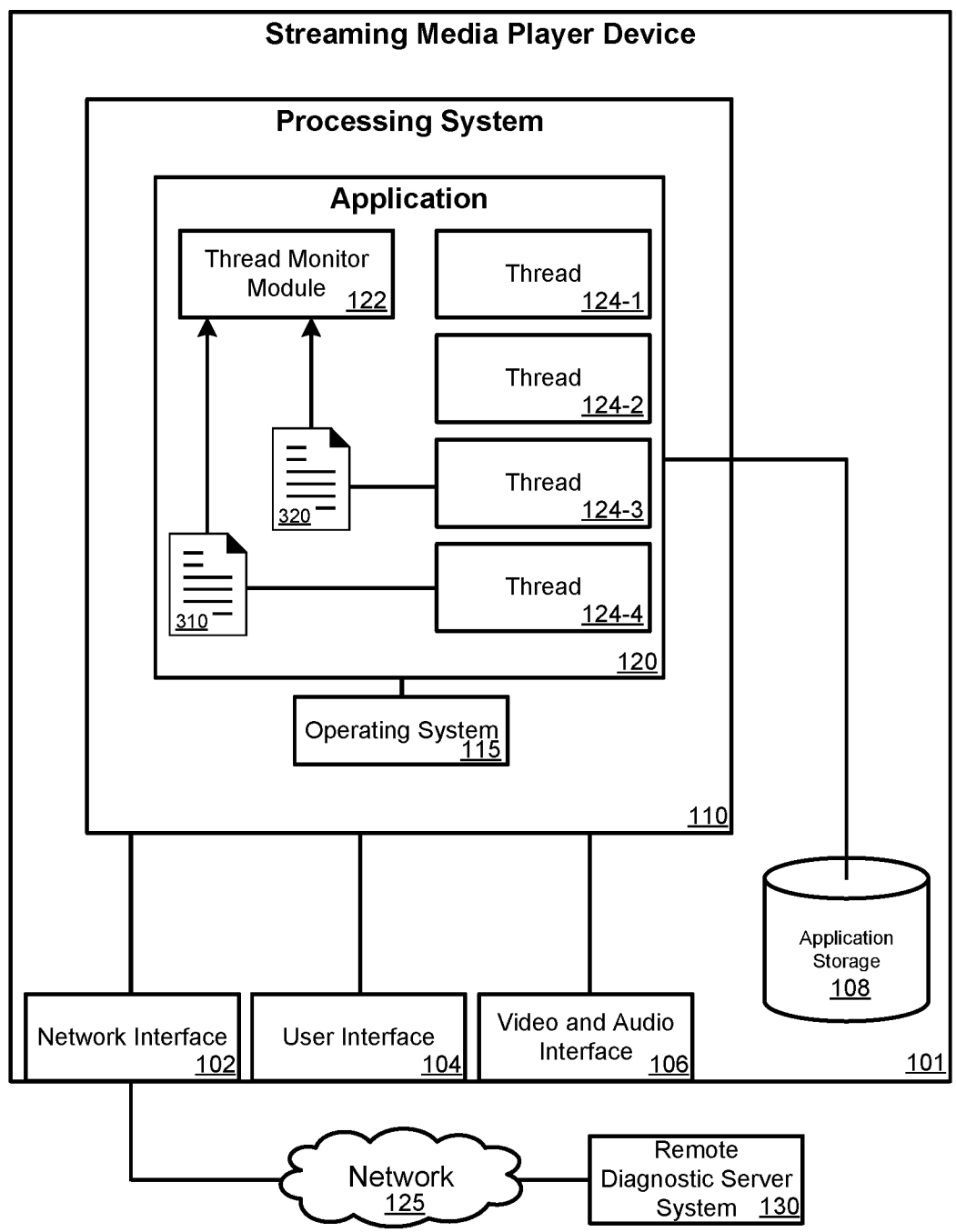
FIG. 3 illustrates an embodiment of the system in which properly executing threads periodically transmitting updates.

FIG. 3 illustrates an embodiment of system 300 in which properly executing threads periodically transmitting updates. System 300 can represent an embodiment of system 100 and/or system 200 of FIGS. 1 and 2 respectively. In system 300, thread 124-4 is transmitting update message 310 to thread monitor module 122. Thread 124-4 may be programmed such that a function call is executed that causes an update message to be transmitted periodically. The update message may include an identifier of thread 124-4. In some embodiments, only the identifier is present as part of the update message. In other embodiments, the identifier is included in addition to other data, such as a timestamp. The update messages may be transmitted at the same or a faster frequency than the initialization message transmitted by thread 124-4 indicated at which updates would be provided. In response to receiving update message 310, thread monitor module 122 may update thread monitor datastore 126 to indicate that an update message has been properly received. Receipt of the update message may cause an amount of time before the thread is identified as hung to reset.

In system 300, thread 124-3 is shown to be transmitting update message 320 to thread monitor module 122. This may occur because thread 124-3 is also registered with thread monitor module 122 to be monitored for hangs. The interval at which thread 124-3 transmits updates may be greater or shorter in accordance with the update reporting interval specified in the initialization message sent to thread monitor module 122 by thread 124-3. Therefore, the programmer who programmed the code of thread 124-3 can decide: 1) whether thread 124-3 is to be monitored for hangs; and 2) the frequency at which updates should be provided to thread monitor module 122. In situations where a thread is expected to wait a significant amount of time, such as due to a known blocking call or is expected to have to wait for a locked object to be released, the update interval may be lengthened in duration to accommodate the thread waiting for these functions to complete without the thread being identified as hung.

As shown in FIG. 3, thread 124-1 and thread 124-2 are not transmitting updates messages to thread monitor module 122. This may be for several reasons. First, thread 124-1, thread 124-2, or both may not be registered with thread monitor module 122 to be monitored for hanging. Second, thread 124-1, thread 124-2, or both may be registered with thread monitor module 122 but may not be due to send an update message. Third, thread 124-1, thread 124-2, or both may be registered with thread monitor module 122 but may be hung.

Figure 4:
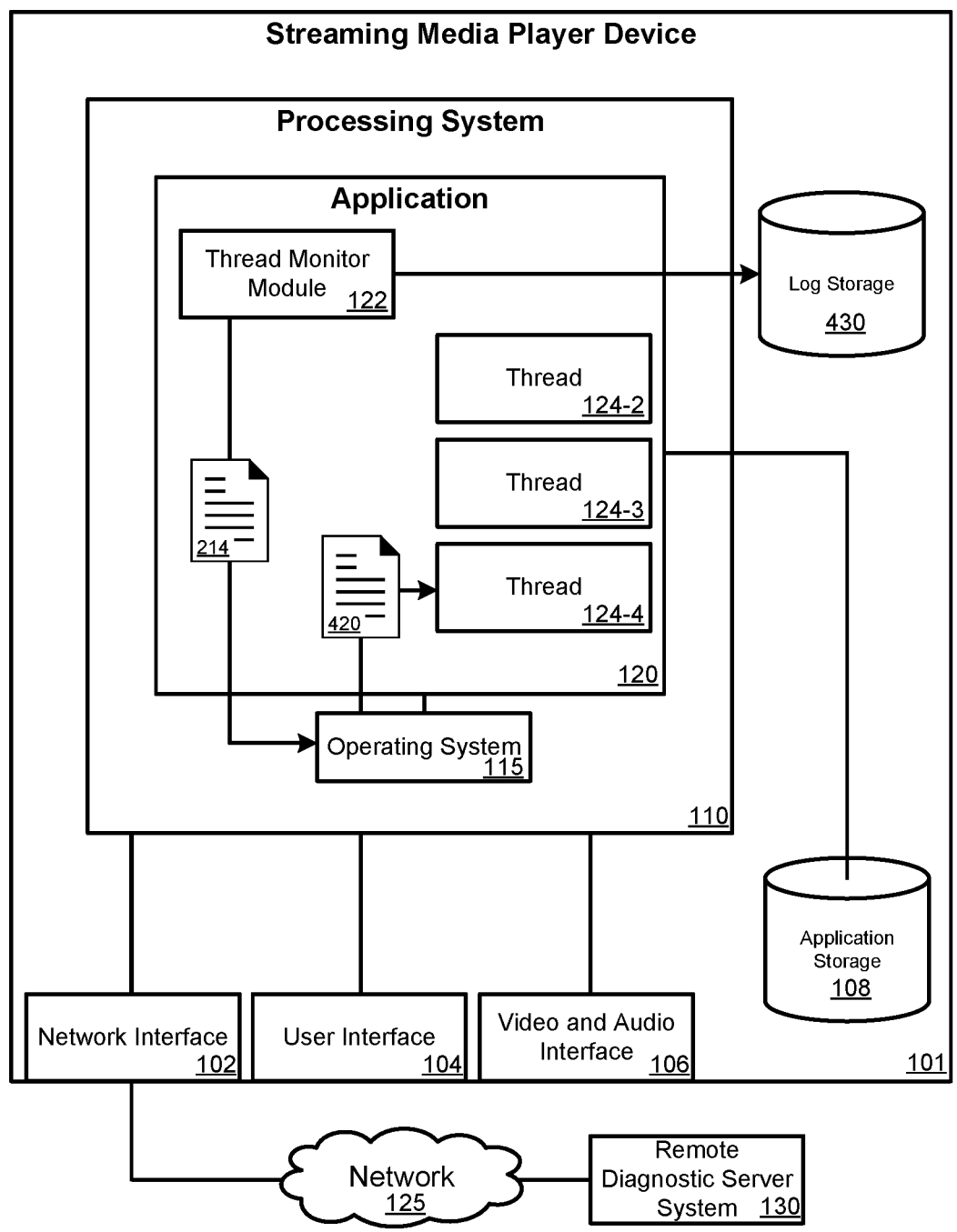
FIG. 4 illustrates an embodiment of the system in which a thread has been identified as hung.

FIG. 4 illustrates an embodiment of the system 400 in which a thread has been identified as hung. System 400 can represent an embodiment of system 100, system 200, and/or system 300. In FIG. 4, an amount of time has elapsed since the embodiment in system 300 in which thread 124-4 transmitted an update message to thread monitor module 122. The time interval for thread 124-4, in accordance with the update reporting interval specified in its monitoring initialization message (or in accordance with a default update reporting interval stored by thread monitor module 122), may have been exceeded one or more times in accordance with missed update threshold specified in its monitoring initialization message (or in accordance with a default missed update threshold stored by thread monitor module 122). In response to such an occurrence, thread 124-4 may be identified by thread monitor module 122 as hung.

In response to thread 124-4 being identified as hung, thread monitor module 122 may take multiple actions. Thread monitor module 122 may write an entry to log storage 430, which may be stored using one or more non-transitory processor-readable mediums. The log entry may indicate the identifier of thread 124-4, a timestamp, and/or an indication of other threads that were currently being executed as part of application 120.

Thread monitor module 122 may raise signal 214 mapped to thread 124-4. Signal 214 may be provided by thread monitor module 122 to operating system 115. Operating system 115, which may be a form of Linux, may be responsible for handling communication between threads. In response to signal 214 being raised, operating system 115 may determine a linked signal handler. The signal handler 420 that is linked with signal 410 may be caused to be executed on top of the stack of thread 124-4 by operating system 115.

Figure 5:
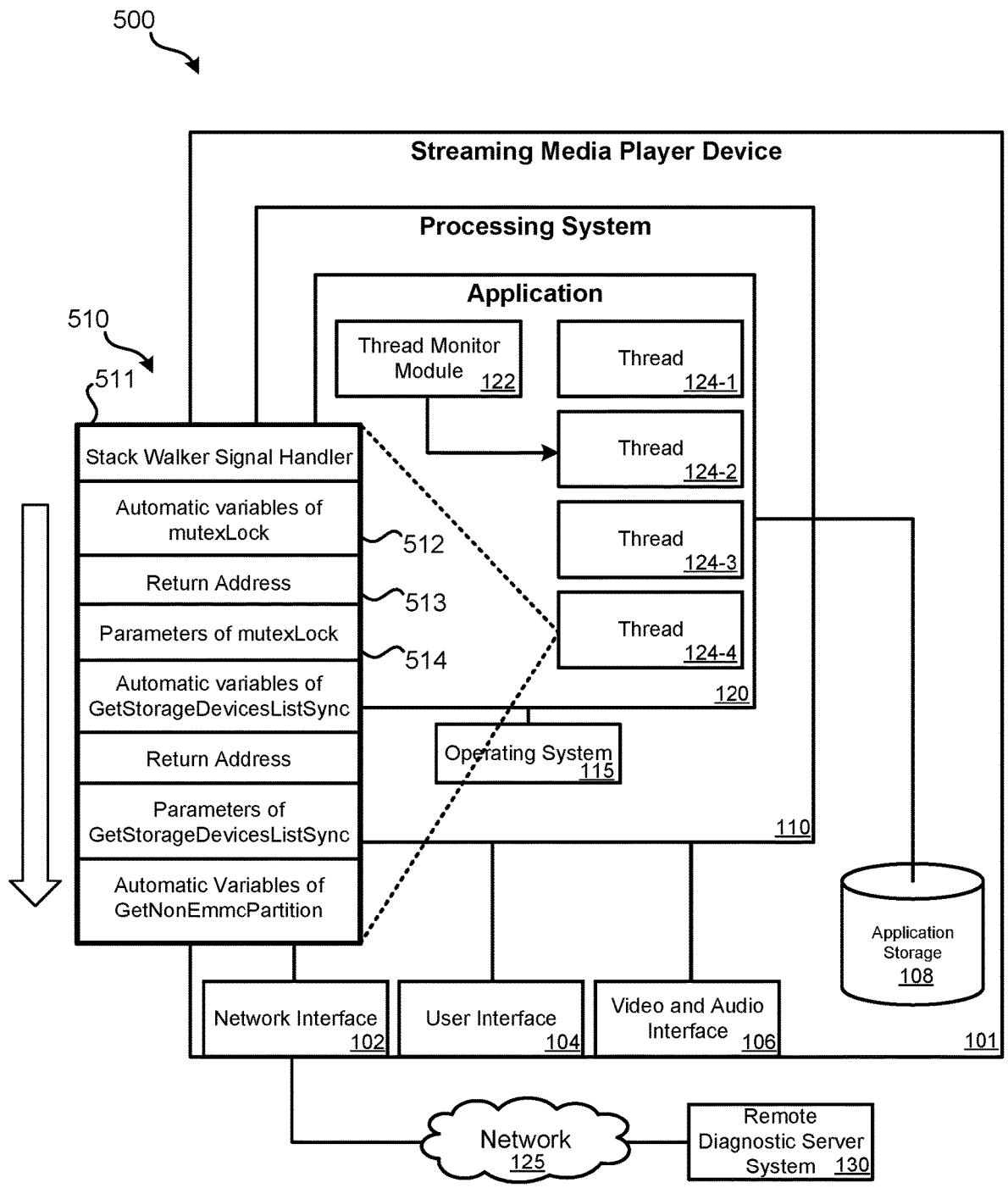
FIG. 5 illustrates an embodiment of the system causing a signal handler to get executed on top of the existing stack of the hung thread.

FIG. 5 illustrates an embodiment of system 500 causing a signal handler to get executed on top of the existing stack of the hung thread. System 500 can represent an embodiment of systems 100-400 of FIGS. 1-4, respectively. Signal handler 420 may be piece of code that is programmed to "walk the stack" and create a log indicative of functions being executed as part of a stack. When signal handler 420 is caused by operating system 115 to be executed on top of the stack of thread 124-4, thread 124-4 may be forced to no longer be hung on the function or action causing thread 124-4 to hang. Rather, thread 124-4 may execute the function of signal handler 420.

Signal handler 420 can identify and output an indication of functions being executed in stack 510 of thread 124-4. A list of functions may be output, such as recorded to a record, that is indicative of the functions present, possibly in order, within stack 510. For instance, signal handler 420, which may be executed on top of stack 510 as stack walker signal handler 511, may output a sequenced list that includes function calls: automatic variables of mutexlock 512; return address 513; parameters of mutexlock 514; etc. Therefore, a stack track of the hung thread is obtained. In some embodiments, a predefined number of elements are returned from the top of the stack, such as fifty. This list of functions may be output to thread monitor module 122 or may be output directly in the form of a report. The examples of function calls and elements in stack 510 are merely examples and are in no way limiting.

In response to thread 124-4 being identified as hung, thread monitor module 122 may send a hang report message 520 to another thread. Thread 124-2 may be identified as a management thread that is responsible for determining an action to take when a thread hangs. Thread monitor module 122 may transmit an indication of thread 124-4 as part of hang report message 520. Other data may be included, such as a list of other threads of application 120 currently executing and/or information about other elements that were present in the stack at the time of the hang (as identified by stack walker signal handler 511).

Thread 124-4 may receive hang report message 520 and determine an action to be performed in response to the thread hanging. Options can include: 1) restarting the thread; 2) ending execution of the thread; 3) restarting application 120; 4) restarting streaming media player device 101 (i.e., rebooting); or 5) contacting remote diagnostic server system 130 for further instructions. Thread 124-2 may respond with an action message indicating an action to be performed by thread monitor module 122 or thread 124-2 may directly perform the necessary action, possibly by communicating with operating system 115.

Thread monitor module 122 may also cause a report indicative of the function calls or other elements of stack 510 to be output by streaming media player device 101 via network interface 102 to remote diagnostic server system 130. The report may be transmitted with various data about the operating environment, including an identifier of streaming media player device 101. The report may be used by remote diagnostic server system 130 to compile analytics on hung threads. This data may be aggregated across may streaming media player devices to target aspects of application 120 that should be debugged by developers.

Figure 6A:
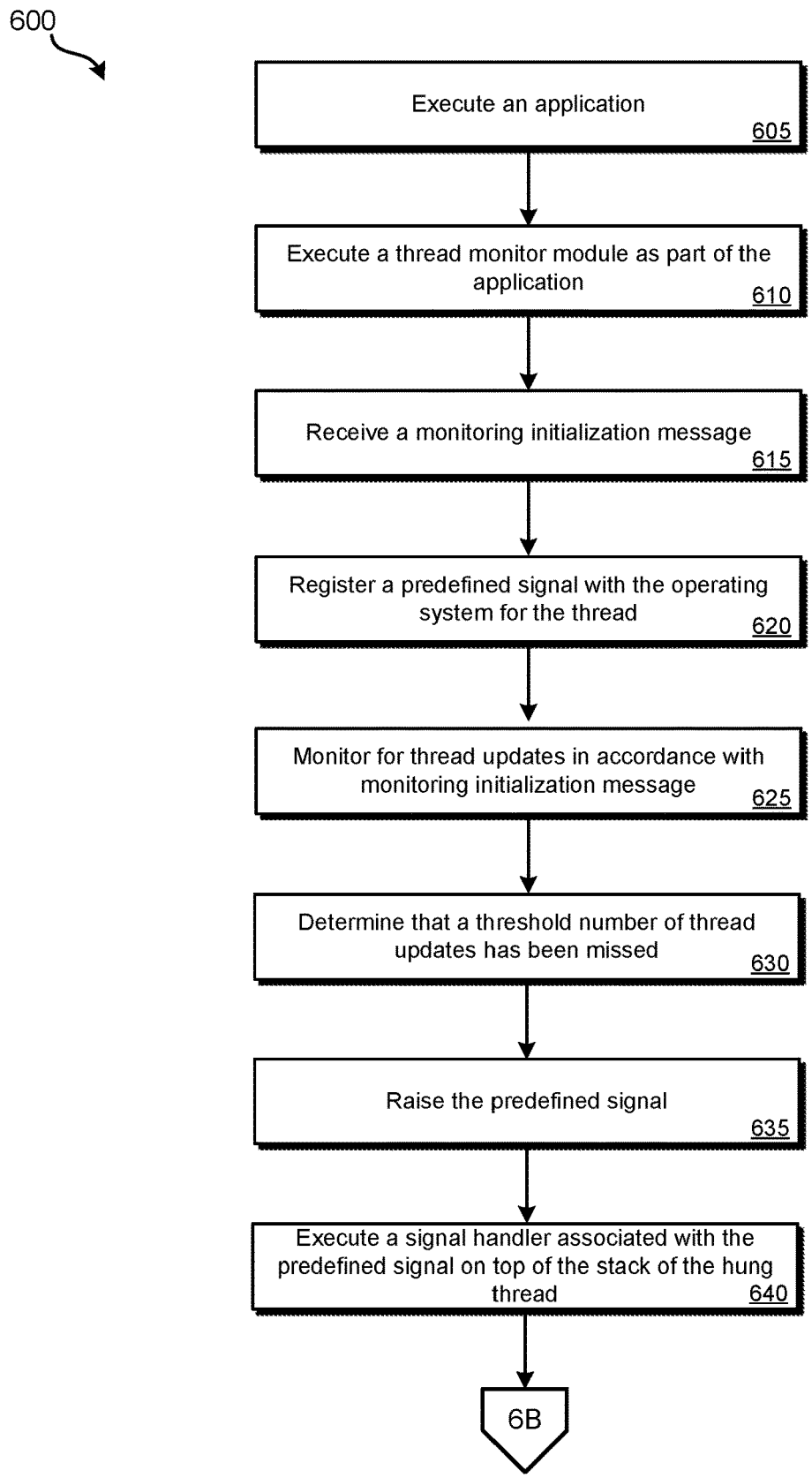
FIGS. 6A and 6B illustrate an embodiment of a method for debugging a hung thread.
Figure 6B:
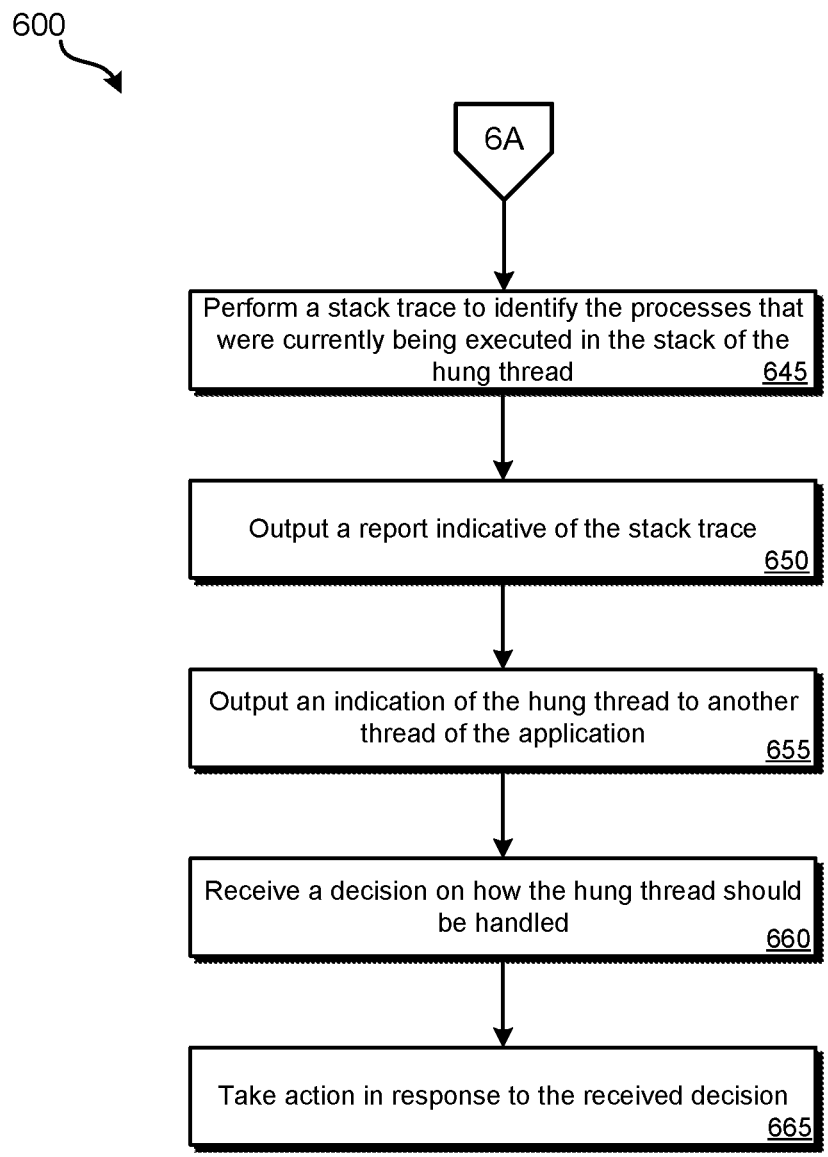

Various methods can be performed using the systems detailed in relation to FIGS. 1-5. FIGS. 6A and 6B illustrates an embodiment of a method 600 for debugging a hung thread. Method 600 may be performed using the systems detailed in relation to FIGS. 1-5. Referring to FIG. 6A, at block 605 an application may be executed. Executing the application may trigger multiple threads to be concurrently or pseudo-concurrently executed. At block 610, in the form of one or more threads, a thread monitor module may be executed as part of the application. Initially, the thread monitor module may not monitor any threads until one or more other threads are registered for monitoring with the thread monitor module.

At block 615, a monitoring initialization message may be received at block 614 by the thread monitor module from another thread of the application. The monitoring initialization message may indicate: 1) an identifier of the thread; 2) an update reporting interval; 3) a missed update threshold; and, possibly, 4) importance class of the thread. In some embodiments, a default value may be used for the update reporting interval or missed update threshold. Unless another value is specified in the message, the default value may be used. In still other embodiments, one or more of these values may be fixed by the thread monitor module. At block 620, the thread monitor module may register a signal with the operating system. This signal is mapped to a signal handler that is to be executed on top of a stack of the thread if the signal is raised by the thread monitor module. The signal handler may obtain a stack trace to determine function calls that are present within the stack.

At block 625, the thread monitor module may monitor the thread and any other threads that have registered with the thread monitor module by transmitting a monitoring initialization message. Block 625 can include thread monitor module monitoring for an update message being received from the thread at the update reporting interval (e.g., at least once per 30 seconds) specified in the thread's monitoring initialization message, the default interval, or the fixed interval. Method 600 may stay on block 625 as long as the monitored threads are functioning properly. If one or more threads are deregistered in response to a thread deregistration message being received from the thread, the threads may cease being monitored.

Block 630 may occur when a thread has missed transmitting an update message at the update reporting interval at least a threshold number of times. The thread may be identified as hung. In some embodiments, a single missed update may result in a thread being determined to be hung at block 630. In other embodiments, a missed update threshold value received as part of the monitoring initialization message, a default value, or a fixed value may be used that is other than one. For instance, if the missed update threshold value is set too low, a thread may be incorrectly identified as hung when it was only waiting for a function call to be unlocked or performed that did eventually happen. In some embodiments, the missed update threshold value may be between 5-10 missed updates.

At block 635, in response to determining that the thread is hung at block 630 by the threshold number of update message having been failed to be sent by the thread, the predefined signal registered at block 620 may be raised by the thread monitor module. In response to the signal being raised, the operating system may cause a linked signal handler to be executed on top of the stack of the hung thread at block 640. This may cause the hung thread to become no longer hung because the signal handler is now being executed on top of the previously-hung thread's stack. While the thread may no longer be hung due to the execution of the signal handler, once the signal handler has completed execution, the thread may remain hung due to the original cause.

Method 600 continues on FIG. 6B. At block 645, the signal handler may be programmed to perform a stack trace. This can involve identifying all or a predefined number of function calls or other elements present within the stack. These function calls or elements may be recorded to a log. At block 650, a report based on the recorded log may be stored, output to a user, and/or transmitted to a remote diagnostic server system. At the remote diagnostic server system, the report may be analyzed along with reports from other devices to create analytics on hung threads. The data present in the report may be reviewed and analyzed by a programmer who can update the software application to correct the issue causing the hang. As such, the output report can be used to improve the functionality of the application.

Blocks 655-665 may be performed before or in lieu of block 650. At block 655, an indication of the hung thread may be output by the thread monitor module to a management thread of the application that is tasked with determining how to handle the hung thread. The indication may be in the form of a message transmitted by the thread monitor module to the management thread that is indicative of an identifier of the hung thread. In response, at block 660, an action message may be received that indicates how the hung thread should be handled. The action message may indicate one of the following actions: 1) restart the thread; 2) end execution of the thread; 3) restart the application; or 4) restart the hardware device executing the application. At block 665, the action may be initiated by the thread monitor module, the operation system, and/or the management thread.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for debugging a hung thread on a streaming media player device, the method comprising:
    executing, by the streaming media player device, a first thread of a plurality of threads, the first thread being a thread monitor module, wherein the thread monitor module monitors for any hung threads within the plurality of threads that function to cause streaming media to be output for presentation;
    receiving, by the thread monitor module of the streaming media player device, from a second thread of the plurality of threads, a monitoring initialization message to initiate thread monitoring of the second thread, wherein the monitoring initialization message comprises: a thread identifier of the second thread; and an update frequency time period;
    registering, by the thread monitor module, a defined signal with an operating system;
    in response to the monitoring initialization message, commence tracking, by the thread monitor module on the streaming media player device, the second thread by determining whether an update message from the second thread has been received within the update frequency time period indicated in the monitoring initialization message;
    receiving, by the thread monitor module from the second thread, the update message that indicates the second thread is not hung;
    determining, by the thread monitor module, that at least the update frequency time period has elapsed since the update message has been received from the second thread, thereby identifying the second thread as the hung thread;
    in response to determining that at least the update frequency time period has elapsed since the update message has been received from the second thread, raising the defined signal on the hung thread;
        receiving, by a management thread of the plurality of threads, from the thread monitor module, an indication of the thread identifier of the hung thread; and
        receiving an action message indicating an action to perform to remediate the hung thread, wherein the action is selected from the group consisting of: restarting an application; restarting the streaming media player device on which the application and the hung thread is executing; restarting the second thread; and ending execution of the second thread.

2. The method for debugging the hung thread of claim 1, further comprising:
    in response to the defined signal being raised on the hung thread, causing a signal handler mapped to the defined signal to be executed on top of a stack of the hung thread.

3. The method for debugging the hung thread of claim 2, further comprising:
    obtaining, by the signal handler, a stack trace of the hung thread.

4. The method for debugging the hung thread of claim 3, further comprising:
    creating a report on the hung thread based on the stack trace.

5. The method for debugging the hung thread of claim 4, further comprising:
    outputting the report on the hung thread via the Internet to a remote diagnostic server system.

6. The method for debugging the hung thread of claim 1, further comprising:
    outputting, by the thread monitor module, an indication of the hung thread being executed.

7. A device, comprising:
a user interface;
a network interface;

a processing system of the device, comprising one or more processors, the processing system being in communication with the user interface and the network interface;

an application, comprising a plurality of threads, executed by the processing system of the device;

a thread monitor module executed by the processing system of the device that monitors for any hung threads within the plurality of threads being executed by the processing system of the device, wherein the thread monitor module is executed as a first thread of the plurality of threads and is configured to:

receive a monitoring initialization message from a second thread of the plurality of threads to initiate thread monitoring of the second thread, wherein the monitoring initialization message comprises: a thread identifier of the second thread; and an update frequency time period;

register a defined signal with an operating system of the device;

in response to the monitoring initialization message, track the second thread by determining whether an update from the second thread has been received within the update frequency time period indicated in the monitoring initialization message;

receive, from the second thread, the update that indicates the second thread is not hung;

determine that at least the update frequency time period has elapsed since the update has been received from the second thread, thereby identifying the second thread as the hung thread;

in response to determining that at least the update frequency time period has elapsed since the update has been received from the second thread, raise the defined signal on the hung thread; and a management thread, executed as part of the plurality of threads, configured to:

receive, from the thread monitor module, an indication of the thread identifier of the hung thread; and receive an action message indicating an action to perform to remediate the hung thread, wherein the action is selected from the group consisting of:

restarting the application; restarting the device on which the application and the hung thread is executing; starting the second thread; and ending execution of the second thread.

8. The device of claim 7, wherein the thread monitor module is further configured to cause a signal handler mapped to the defined signal to be executed on top of a stack of the hung thread in response to the defined signal being raised on the hung thread.

9. The device of claim 8, the device further comprising the signal handler, wherein the signal handler, when executed on top of the stack of the hung thread is configured to obtain a stack trace of the hung thread.

10. The device of claim 9, wherein the thread monitor module is further configured to output a report generated based on the stack trace via the Internet to a remote diagnostic server system.

11. The device of claim 7, wherein the thread monitor module is further configured to:

output an indication of the hung thread to another thread of the application.

12. The device of claim 7, wherein the device is a streaming media player device that comprises the processing system.

13. A non-transitory processor-readable medium comprising processor-readable instructions configured to cause one or more processors of a device to:

execute, a first thread of a plurality of threads, the first thread being a thread monitor module, wherein the thread monitor module monitors for hung threads within the plurality of threads;

receive a monitoring initialization message from a second thread of the plurality of threads, wherein the monitoring initialization message initiates thread monitoring of the second thread and the monitoring initialization message comprises: a thread identifier of the second thread; and an update frequency time period;

register a defined signal with an operating system;

in response to the monitoring initialization message, track the second thread by determining whether an update from the second thread has been received within the update frequency time period indicated in the monitoring initialization message;

receive, from the thread, the update that indicates the second thread is not hung;

determine that at least the update frequency time period has elapsed since the update has been received from the second thread, thereby identifying the second thread as a hung thread;

in response to determining that at least the update frequency time period has elapsed since the update has been received from the second thread, raise a defined signal on the hung thread; and receive, by a management thread of the plurality of threads, from the thread monitor module, an indication of the thread identifier of the hung thread; and receive an action message indicating an action to perform to remediate the hung thread, wherein the action is selected from the group consisting of: restarting an application; restarting the device on which the application and the hung thread is executing; restarting the second thread; and ending execution of the second thread.

14. The non-transitory processor-readable medium of claim 13 wherein the processor-readable instructions are further configured to cause the one or more processors to cause a signal handler mapped to the defined signal to be executed on top of a stack of the hung thread in response to the defined signal being raised on the hung thread.

* * * * *